(12) United States Patent
Mnih et al.

(10) Patent No.: US 10,956,820 B2
(45) Date of Patent: Mar. 23, 2021

(54) REINFORCEMENT LEARNING WITH AUXILIARY TASKS

(71) Applicant: DeepMind Technologies Limited, London (GB)

(72) Inventors: Volodymyr Mnih, London (GB); Wojciech Czarnecki, London (GB); Maxwell Elliot Jaderberg, London (GB); Tom Schaul, London (GB); David Silver, Hitchin (GB); Koray Kavukcuoglu, London (GB)

(73) Assignee: DeepMind Technologies Limited, London (GB)

(*) Notice: Subject to any disclaimer, the term of this patent is extended or adjusted under 35 U.S.C. 154(b) by 0 days.

(21) Appl. No.: 16/403,385

(22) Filed: May 3, 2019

(65) Prior Publication Data

US 2019/0258938 A1 Aug. 22, 2019

Related U.S. Application Data

(63) Continuation of application No. PCT/IB2017/056906, filed on Nov. 4, 2017.
(Continued)

(51) Int. Cl.
*G06N 3/08* (2006.01)
*G06N 20/00* (2019.01)
(Continued)

(52) U.S. Cl.
CPC ............. *G06N 3/084* (2013.01); *G06N 3/006* (2013.01); *G06N 3/0445* (2013.01); *G06N 3/0454* (2013.01); *G06N 20/00* (2019.01)

(58) Field of Classification Search
CPC .............................. G06N 20/00; G06N 3/084
See application file for complete search history.

(56) References Cited

U.S. PATENT DOCUMENTS

2009/0141969 A1  6/2009  Yu et al.

OTHER PUBLICATIONS

Kulkarni et al ("Deep Successor Learning", https://arxiv.org/pdf/1606.02396.pdf, arXiv:1606.02396v1 [stat.ML] Jun. 8, 2016, pp. 1-10) (Year: 2016).*

(Continued)

*Primary Examiner* — Kakali Chaki
*Assistant Examiner* — Robert Lewis Kulp
(74) *Attorney, Agent, or Firm* — Fish & Richardson P.C.

(57) ABSTRACT

Methods, systems, and apparatus, including computer programs encoded on a computer storage medium, for training a reinforcement learning system. The method includes: training an action selection policy neural network, and during the training of the action selection neural network, training one or more auxiliary control neural networks and a reward prediction neural network. Each of the auxiliary control neural networks is configured to receive a respective intermediate output generated by the action selection policy neural network and generate a policy output for a corresponding auxiliary control task. The reward prediction neural network is configured to receive one or more intermediate outputs generated by the action selection policy neural network and generate a corresponding predicted reward. Training each of the auxiliary control neural networks and the reward prediction neural network comprises adjusting values of the respective auxiliary control parameters, reward prediction parameters, and the action selection policy network parameters.

20 Claims, 4 Drawing Sheets

Related U.S. Application Data

(60) Provisional application No. 62/418,120, filed on Nov. 4, 2016.

(51) Int. Cl.
*G06N 3/04* (2006.01)
*G06N 3/00* (2006.01)

(56) References Cited

OTHER PUBLICATIONS

Stadie et al ("Incentivizing Exploration in Reinforcement Learning With Deep Predictive Models", https://arxiv.org/pdf/1507.00814.pdf, arXiv:1507.00814v3 [cs.AI] Nov. 19, 2015, pp. 1-11) (Year: 2015).*
Lillicrap et al ("Continuous control with deep reinforcement learning", https://arxiv.org/pdf/1509.02971.pdf, arXiv:1509.02971v1 [cs.LG] Sep. 9, 2015, pp. 1-14) (Year: 2015).*
Hausknecht et al ("Deep Recurrent Q-Learning for Partially Observable MDPs", https://arxiv.org/pdf/1507.06527.pdf, arXiv:1507.06527v3 [cs.LG] Aug. 27, 2015, pp. 1-9) (Year: 2015).*
Lample et al ("Playing FPS Games with Deep Reinforcement Learning", https://arxiv.org/pdf/1609.05521v1.pdf, arXiv:1609.05521v1 [cs.AI] Sep. 18, 2016, pp. 1-7) (Year: 2016).*
Wang et al ("Dueling Network Architectures for Deep Reinforcement Learning", https://arxiv.org/pdf/1511.06581v2.pdf, arXiv: 1511.06581v2v3 [cs.LG] Jan. 8, 2016, pp. 1-16) (Year: 2016).*
Oh et al. ("Action-Conditional Video Prediction using Deep Networks in Atari Games", https://arxiv.org/pdf/1507.08750v2.pdf, arXiv: 1507.08750v2 [cs.LG] Dec. 22, 2015, pp. 1-26) (Year: 2015).*
Li et al. ("Recurrent Reinforcement Learning: A Hybrid Approach", https://arxiv.org/pdf/1509.03044v2v2.pdf, arXiv:1507.08750v2 [cs.LG] Nov. 19, 2015, pp. 1-11) (Year: 2015).*
Barreto et al, "Successor features for transfer in reinforcement learning," arXiv preprint arXiv:1606.05312, 2016, 11 pages.
Bellemare et al, "The arcade learning environment: An evaluation platform for general agents," Journal of Artificial Intelligence Research, 2012, pp. 253-279.
Dayan, "Improving generalization for temporal difference learning: The successor representation," Neural Computation, 1993, pp. 5(4):613-624.
Gers et al, "Learning to forget: Continual prediction with lstm," Neural computation, 2000, pp. 12(10):2451-2471.
Github.com [online], "id-Software/ Quake-III-Arena," 2019, [retrieved on May 9, 2019], URL: <https://github.com/id-Software/Quake-III-Arena>, 3 pages.
Kempka et al, "Vizdoom: A doom-based ai research platform for visual reinforcement learning," arXiv preprint arXiv:1605.02097, 2016, 8 pages.
Konidaris & Barreto, "Skill discovery in continuous reinforcement learning domains using skill chaining," Advances in Neural Information Processing Systems, 2009, pp. 1015-1023.
Kulkarni et al, "Deep Successor Reinforcement Learning," arXiv preprint arXiv:1606.02396, 2016, 10 pages.
Lample & Chaplot, "Playing FPS Games with Deep Reinforcement Learning," 2016, pp. 2140-2146.
Li et al, "Recurrent Reinforcement Learning: A Hybrid Approach," CORR, 2015, 11 pages.
Mirowski et al, "Learning to navigate in complex environments," 2016, 16 pages.

Mnih et al, "Asynchronous methods for deep reinforcement learning," Proceedings of the 33rd International Conference on Machine Learning (ICML), 2016, pp. 1928-1937.
Mnih et al, "Human-level control through deep reinforcement learning," Nature, 2015, pp. 518(7540):529-533.
Mnih et al, "Playing atari with deep reinforcement learning," NIPS Deep Learning Workshop, 2013, 9 pages.
Oh et al, "Action-conditional video prediction using deep networks in atari games," Advances in Neural Information Processing Systems, 2015, pp. 2863-2871.
Oh et al, "Control of memory, active perception, and action in minecraft," arXiv preprint arXiv:1605.09128, 2016, 22 pages.
OpenArenawikia.com [online] "The openarena manual," 2019, [retrieved on May 9, 2019], retrieved from: URL<http://openarena.wikia.com/wiki/Manual>, 6 pages.
Parisotto et al, "Actor-Mimic: Deep Multitask and Transfer Reinforcement Learning," CORR, 2016, 16 pages.
PCT International Search Report and Written Opinion in International Appln. No. PCT/IB2017/056906, dated Nov. 21, 2018, 14 pages.
Peng & Williams, "Incremental multi-step q-learning," Machine Learning, 1996, pp. 22(1-3):283-290.
Schacter et al, "The future of memory: remembering, imagining, and the brain," Neuron, 2012, pp. 76(4):677-694.
Schaul et al, "Prioritized experience replay," arXiv preprint arXiv:1511.05952, 2015, 21 pages.
Schaul et al, "Universal value function approximators," Proceedings of the 32nd International Conference on Machine Learning (ICML-15), 2015, pp. 1312-1320.
Schmidhuber, "Formal theory of creativity, fun, and intrinsic motivation (1990-2010)," IEEE Transactions on Autonomous Mental Development, 2010 pp. 2(3):230-247.
Silver & Ciosek, "Compositional planning using optimal option models," arXiv preprint arXiv:1206.6473, 2012, 8 pages.
Silver et al, "Mastering the game of go with deep neural networks and tree search," Nature, 2016, pp. 529(7587):484-489.
Sutton et al, "Between mdps and semi-mdps: A framework for temporal abstraction in reinforcement learning," Artificial intelligence, 1999, pp. 181-211.
Sutton et al, "Horde: A scalable real-time architecture for learning knowledge from unsupervised sensorimotor interaction," The 10th International Conference on Autonomous Agents and Multiagent Systems—vol. 2, 2011, pp. 761-768.
Sutton et al, "Policy gradient methods for reinforcement learning with function approximation," NIPS, 1999, pp. 1057-1063.
Tessler et al, "A deep hierarchical approach to lifelong learning in minecraft," arXiv preprint arXiv:1604.07255, 2016.
Wang et al, "Dueling Network Architectures for Deep Reinforcement Learning," arXiv preprint arXiv:1511.06581, 2016, 15 pages.
Watkins, "Learning from Delayed Rewards," PhD thesis of Christopher John Cornish Hellaby Watkins, King's College, Cambridge, England, 1989, 241 pages.
Xie et al, "Modelbased reinforcement learning with parametrized physical models and optimism-driven exploration," CoRR, abs/1509.06824, 2016, 8 pages.
Zahavy et al, "Graying the black box: Understanding dqns," Proceedings of the 33rd International Conference on Machine Learning, 2016.
PCT International Preliminary Report on Patentability in International Appln. No. PCT/IB2017/056906, dated May 16, 2019, 14 pages.
EP Office Action in European Appln. No. 17808163.4-1221, dated Jun. 12, 2019, 3 pages.
JP Office Action in Japanese Appln. No. 2019-523801, dated Aug. 31, 2020, 7 pages (with English translation).

* cited by examiner

REINFORCEMENT LEARNING WITH AUXILIARY TASKS

CROSS-REFERENCE TO RELATED APPLICATIONS

This application is a continuation application of, and claims priority to, PCT Patent Application No. PCT/IB2017/056906, filed on Nov. 4, 2017, which application claims the benefit under 35 U.S.C. § 119(e) of U.S. Patent Application No. 62/418,120, filed Nov. 4, 2016. The disclosure of each of the foregoing applications is incorporated herein by reference.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a reinforcement learning system implemented as computer programs on one or more computers in one or more locations that selects actions to be performed by an agent interacting with an environment. Generally, the system uses an action selection policy neural network in selecting actions to be performed in response to observations of the environment. To improve training of the action selection policy neural network, during this training, the system also trains (i) one or more auxiliary control neural networks, (ii) a reward prediction neural network, or both, that receive as inputs respective intermediate outputs of the action selection policy neural network.

In general, one innovative aspect may be embodied in a method for training a reinforcement learning system, where the method includes: training an action selection policy neural network using a first reinforcement learning technique, wherein the action selection policy neural network has a plurality of action selection policy network parameters and is used in selecting actions to be performed by an agent interacting with an environment, in particular in performing a main task. The action selection policy neural network may be configured to receive an input comprising an observation input and to process the input in accordance with the network parameters to generate an action selection policy output, and wherein training the action selection policy neural network comprises adjusting values of the action selection policy network parameters. The method may comprise, during the training of the action selection neural network using the first reinforcement learning technique: training each of one or more auxiliary control neural networks on interactions of the agent with the environment during the training of the action selection neural network, wherein each of the auxiliary control neural networks has respective auxiliary control parameters and corresponds to a respective auxiliary control task and is configured to: receive a respective intermediate output generated by the action selection policy neural network, and generate a policy output for the corresponding auxiliary control task in accordance with the respective auxiliary control task parameters of the auxiliary control neural network; and wherein training each of the auxiliary control neural networks comprises: determining gradients based on policy outputs generated by the auxiliary control neural network; and adjusting values of the respective auxiliary control parameters and the action selection policy network parameters using the gradients.

The action selection policy output may define an action to be performed by the agent in the environment; as described later, the agent may be a robotic agent. In implementations an auxiliary control neural network may comprise one or more neural network layers coupled to one or more hidden layers of the action selection policy neural network, that is the intermediate output may comprise an output from these one or more hidden layers. Thus training the auxiliary control neural network may also involve training part of the action selection policy neural network, more specifically part of this network between the input and the intermediate layer. Thus in implementations parameters (e.g. weights) of the action selection policy neural network are trained by training of the action selection policy neural network, and some of these parameters are also trained by training the auxiliary control neural network(s), more specifically by backpropagating gradients from the auxiliary control neural network(s) into the action selection policy neural network via the intermediate output. The gradients may be gradients of a policy loss function for an auxiliary control task with respect to the parameters. The policy output from an auxiliary control neural network may be used to compute a loss function for such backpropagation; the particular loss function depends on the auxiliary control task(s) selected; there are many such tasks which may be implemented. Very similar considerations apply for an auxiliary reward prediction neural network; in this case the gradients may be determined from a reward prediction loss function.

In some implementations, training each of the auxiliary control neural networks comprises: receiving auxiliary task rewards that are specific to the corresponding auxiliary control task in response to the interactions of the agent with the environment; and training the auxiliary control neural networks to maximize an expected task reward, more particularly an expected long-term time-discounted auxiliary task reward, for the corresponding auxiliary control task, in some cases but not essentially using a respective second reinforcement learning technique. For example the first reinforcement learning technique may be an on-policy technique and the second reinforcement learning technique may be an off-policy technique, and/or the second reinforcement learning technique may be simpler than the first, for efficiency. In some implementations an expected long-term time-discounted auxiliary task reward, as described here and later, may comprise an expected n-step return, more particularly a return expected after n time (action) steps actions where rewards later in time are given a reduced weighting.

In some implementations, as previously described, training the auxiliary control neural networks to maximize an expected long-term time-discounted auxiliary task reward for the corresponding auxiliary control task using a respective second reinforcement learning technique comprises backpropagating gradients computed, in some cases using the respective second reinforcement learning technique, into the action selection policy neural network to adjust the values of the action selection policy parameters.

In some implementations, the one or more auxiliary control neural networks comprise a pixel control neural network that corresponds to a pixel control task for an observation which includes an image. The pixel control task may attempt to maximize, for each of one or more regions of each observation image, a maximal change in the values of pixels in the region. For each observation image the respective reward for each of the one or more regions may be derived from a change in the pixels in the region from the observation image to a next observation image received as a result of the agent performing an action in response to the observation image. In performing such a pixel control task the pixel control neural network, and part of the action selection policy neural network, may together learn to control aspects of the environment affecting the visual input, and the representations learned in the action selection policy neural network may then be useful in learning to perform the main task.

In some implementations, the pixel control neural network is configured to, for a received observation image: receive the respective intermediate output for the pixel control neural network; and process the respective intermediate output to generate, for each of the one or more regions and for each of a plurality of possible actions to be performed by the agent, an estimate of a change, more particularly an estimate of the long-term time-discounted change, in the pixels in the region if the agent performs the possible action in response to the received observation image. The long-term time-discounted change in the pixels may comprise may comprise a change expected after n time (action) steps actions where changes later in time are given a reduced weighting.

In some implementations, the pixel control neural network may comprise a deconvolutional neural network. The deconvolutional neural network may be used to determine a set of spatially mapped auxiliary reward function values, such as action-value function values, which may be used to train the pixel control neural network. In some implementations, where the action selection policy neural network comprises one or more convolutional neural followed by one or more recurrent neural network layers, the pixel control neural network may be coupled to an output of one of the one or more recurrent neural network layers.

In some implementations, the auxiliary control neural networks comprise a feature control neural network that corresponds to a feature control task that attempts to maximize activations generated by one or more units in a particular hidden layer of the action selection policy neural network (which may involve use of a corresponding target network so that the features change less frequently). For each observation image, the respective reward for each of the one or more units may be derived from a change in the activations of the unit from activations generated during processing the observation image to activations generated during processing of a next observation image received as a result of the agent performing an action in response to the observation image. The feature control task may be thought of as similar to a pixel control task but on higher level visual features.

In some implementations, the feature control neural network is configured to, for a received observation image: receive the respective intermediate output for the feature control neural network; and process the respective intermediate output to generate, for each of the one or more units and for each of a plurality of possible actions to be performed by the agent, an estimate of the long-term time-discounted change in the activations generated by the unit if the agent performs the possible action in response to the received observation image.

In general, another innovative aspect may be embodied in a method for training a reinforcement learning system, where the method includes: training an action selection policy neural network using a first reinforcement learning technique, wherein the action selection policy neural network has a plurality of network parameters and is used in selecting actions to be performed by an agent interacting with an environment, wherein the action selection policy neural network is configured to receive an input comprising an observation input and to process the input in accordance with the network parameters to generate an action selection policy output, and wherein training the action selection policy neural network comprises adjusting values of the action selection policy network parameters; during the training of the action selection neural network using the first reinforcement learning technique: training a reward prediction neural network on interactions of the agent with the environment during the training of the action selection neural network, wherein the reward prediction neural network has reward prediction parameters and is configured to: receive one or more intermediate outputs generated by the action selection policy neural network that characterize a sequence of observation images received as a result of the interactions of the agent with the environment, and process the one or more intermediate outputs in accordance with the reward prediction parameters to generate a predicted reward that is an estimate of a reward that will be received with a next observation image that follows a last observation image in the sequence; and wherein training the reward prediction neural network comprises: determining gradients based on predicted rewards generated by the reward prediction neural network; and adjusting values of the reward prediction parameters and the action selection policy network parameters using the gradients.

In some implementations, training the reward prediction neural network comprises: receiving an actual reward received with the next or a subsequent observation image; and training the immediate reward neural network to decrease a loss between the actual reward and the estimated reward, more particularly the value of a loss function dependent on a difference between the actual reward and the estimated reward. As described later training the reward prediction neural network may comprise sampling from sequences of observations stored in an experience replay memory, in particular so as to over-represent rewarding sequences/events, which can be advantageous when rewards in the environment are sparse.

In some implementations, training the immediate reward neural network to decrease a loss between the actual reward and the estimated reward comprises: backpropagating gradients computed into the action selection policy neural network to adjust the values of the action selection policy parameters.

In some implementations, the action selection policy neural network comprises: a convolutional encoder neural network that generates an encoded representation of the input, an intermediate neural network that processes the encoded representation of the input to generate an intermediate representation; and an output neural network that processes the intermediate representation to generate the action selection output.

In some implementations, the intermediate neural network is a recurrent neural network and the one or more intermediate outputs generated by the action selection policy neural network that characterize the sequence of observation images are the intermediate representation for the last observation image in the sequence.

In some implementations, the one or more intermediate outputs generated by the action selection policy neural network that characterize the sequence of observation images are the encoded representations for the observation images in the sequence.

In some implementations, training the reward prediction neural network comprises sampling sequences of observations from a replay memory.

In some implementations, sampling sequences of observations comprises: sampling sequences for which the actual reward received with the observation following the last observation in the sequence is non-zero with a higher probability than sequences for which the actual reward received with the observation following the last observation in the sequence is zero.

In some implementations, the first reinforcement learning technique is an actor-critic reinforcement learning technique, wherein the action selection policy output comprises value estimates and Q-values. The value estimates may define the value or expected return from a state; the Q-values may define the expected return for a particular action in the state, and may be implicit in, say, an advantage value defining the advantage of the action over the baseline value estimate. The method may then further comprise resampling recent sequences from the replay memory; and performing extra value function regression on the value estimates for the observation images in the resampled recent sequences. Thus the extra value function regression may comprise additional training using the sequences from the replay memory; where an n-step return is computed the method may further randomly vary n. This can help to exploit benefits of the reward prediction task.

The above aspects can be implemented in any convenient form. For example, aspects and implementations may be implemented by appropriate computer programs which may be carried on appropriate carrier media which may be tangible carrier media (e.g. disks) or intangible carrier media (e.g. communication signals). Aspects may also be implemented using suitable apparatus which may take the form of programmable computers running computer programs.

Particular embodiments of the subject matter described in this specification can be implemented so as to realize one or more of the following advantages. By training one or more auxiliary control neural networks or a reward prediction neural network or both to perform auxiliary tasks and prediction, in addition to training the action selection policy neural network to maximize cumulative extrinsic reward, the reinforcement learning system described in this specification can augment the feedback signals received during the training of the action selection policy neural network to improve training. In particular, training the auxiliary control neural networks or reward prediction neural network tunes the values of the set of parameters of the action selection policy neural network, causing them to generate more useful representations of observed data and ultimately determine more effective policy outputs to maximize cumulative extrinsic reward. For example, training the reward prediction neural network tunes the values of the set of parameters of the action selection policy neural network to recognize observations that lead to receiving a high reward at a subsequent time step, and thereby allow the action selection policy neural network to determine more effective policy outputs to maximize the expected long-term time-discounted extrinsic reward, even when extrinsic rewards are only rarely non-zero.

In contrast, training reinforcement learning systems by conventional methods is slow when the training is based only on extrinsic rewards that are rarely non-zero. Furthermore, training the auxiliary control neural networks or reward prediction neural network causes the action selection policy neural network to generate representations that are closely matched with the agent's long-term goals, unlike conventional reinforcement learning systems that include unsupervised training that is generic and not closely matched with the agent's long-term goals.

The reinforcement learning system described in this specification trains the action selection policy neural network faster than conventional reinforcement learning systems. Therefore, the reinforcement learning system described in this specification allows more efficient use of computational resources in training. Moreover, the reinforcement learning system described in this specification achieves superior performance to conventional reinforcement learning systems, for example by receiving more cumulative extrinsic reward.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
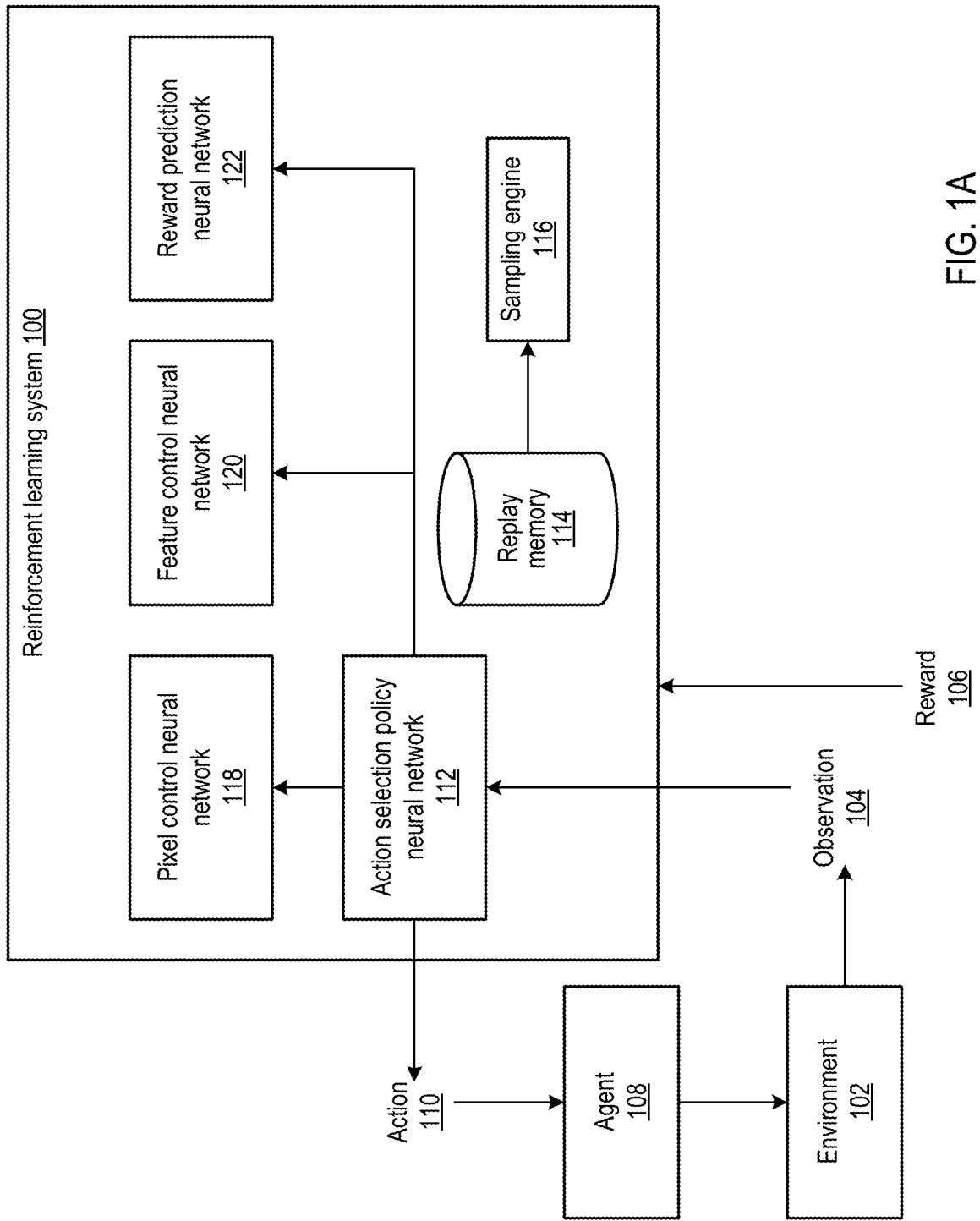
FIG. 1A shows an example reinforcement learning system.

FIG. 1A shows an example reinforcement learning system 100. The reinforcement learning system 100 is an example of a system implemented as computer programs on one or more computers in one or more locations in which the systems, components, and techniques described below are implemented.

The reinforcement learning system 100 selects actions 110 to be performed by an agent 108 interacting with an environment 102 at each of multiple time steps. In order for the agent 108 to interact with the environment 102, the system 100 receives data characterizing the current state of the environment 102, e.g., an image of the environment, and selects an action 110 to be performed by the agent 108 in response to the received data. Data characterizing a state of the environment 102 will be referred to in this specification as an observation 104.

In some implementations, the environment 102 is a simulated environment and the agent 108 is implemented as one or more computer programs interacting with the simulated environment. For example, the simulated environment may be a video game and the agent may be a simulated user playing the video game. As another example, the simulated environment may be a motion simulation environment, e.g., a driving simulation or a flight simulation, and the agent is a simulated vehicle navigating through the motion simulation environment. In these implementations, the actions may be control inputs to control the simulated user or simulated vehicle.

In some other implementations, the environment 102 is a real-world environment and the agent 110 is a mechanical agent interacting with the real-world environment. For example, the agent may be a robot interacting with the environment to accomplish a specific task. As another example, the agent may be an autonomous or semi-autonomous vehicle navigating through the environment. In these implementations, the actions may be control inputs to control the robot or the autonomous vehicle. In some of these implementations, the observations 104 may be generated by or derived from sensors of the agent 108. For example, the observations 104 may be captured by a camera of the agent 108. As another example, the observations 104 may be derived from data captured from a laser sensor of the agent 108. As another example, the observations may be hyperspectral images captured by a hyperspectral sensor of the agent 108.

The system 100 uses an action selection policy neural network 112 in selecting actions to be performed by the agent 108 in response to observations 104 at each time step. In particular, the action selection policy neural network 112 is configured to receive an observation 104 as input and to process the input in accordance with a set of parameters, referred to in this specification as action selection policy neural network parameters, to generate a policy output that the system 100 uses to determine an action 110 to be performed by the agent 108 at the time step. For example, the policy output may be a probability distribution over the set of possible actions. As another example, the policy output may be a Q-value that is an estimate of the long-term time-discounted reward that would be received if the agent 108 performs a particular action in response to the observation. As another example, the policy output may identify a particular action that is predicted to yield the highest long-term time-discounted reward if performed by the agent in response to the observation.

In general, the action selection policy neural network 112 includes a convolutional encoder neural network that generates an encoded representation of the input observation, an intermediate neural network that processes the encoded representation of the input observation to generate an intermediate representation, and an output neural network that processes the intermediate representation to generate the policy output.

At each time step, the system 100 receives a reward 106 based on the current state of the environment 102 and the action 110 of the agent 108 at the time step. In general, the system 100 trains the action selection policy neural network 112 to generate policy outputs that maximize the expected long-term time-discounted reward received by the system 100, by using a reinforcement learning technique to iteratively adjust the values of the action selection policy neural network parameters.

For one or more time steps, the system 100 stores the experience tuple for the time step in a replay memory 114, where in this specification the term experience tuple refers to the observation 104 at the time step, the action 110 of the agent at the time step, the reward 106 received at the time step, and the observation of the next time step.

In some implementations, the system 100 trains the action selection policy neural network 112 using an on-policy reinforcement learning technique and trains the action selection policy neural network 112 based on experience tuples as they are generated. An example method for on-policy reinforcement learning is described in Volodymyr Mnih et. al., "Asynchronous methods for deep reinforcement learning," Proceedings of the $33^{rd}$ International Conference on Machine Learning, 2016. Another example method for on-policy reinforcement learning is a policy gradient method. In some other implementations, the system 100 trains the action selection policy neural network 112 using an off-policy reinforcement learning technique, for example one-step or n-step Q-learning, based on experience tuples as they are generated or that a sampling engine 116 samples from the replay memory 114.

An example of an action selection policy neural network 112 is described in Volodymyr Mnih et. al., "Asynchronous methods for deep reinforcement learning," Proceedings of the $33^{rd}$ International Conference on Machine Learning, 2016. Other examples of action selection policy neural network 112 include DQN (Deep Q-Network), DDPG (Deep Deterministic Policy Gradient), and TRPO (Trust Region Policy Optimization) networks.

In addition to training the action selection policy neural network 112 to maximize the expected long-term time-discounted reward, the system 100 may train the action selection policy neural network 112 by additionally training one or more auxiliary control neural networks, e.g. a pixel control neural network 118, or a feature control neural network 120, or both. Training the auxiliary control neural networks tunes the values of the set of parameters of the action selection policy neural network 112, causing the action selecting policy neural network 112 to generate more useful representations of observations 104 that are closely matched with the long-term goals of the agent 110 and thereby determine more effective policy outputs to maximize the expected long-term time-discounted reward, even when non-zero rewards 106 are only rarely received.

Each auxiliary control neural network has a respective set of parameters, referred to in this specification as auxiliary control neural network parameters, and receives as input respective intermediate outputs of the action selection policy neural network 112 when processing a given observation 104. Since each auxiliary control neural network receives as input a respective intermediate output of the action selection policy neural network 112, each auxiliary control neural network may be considered as sharing parameters with the action selection policy neural network 112. An intermediate output of the action selection policy neural network 112 is a set of activations generated at one or more units of one or more hidden layers of the action selection policy neural network 112 in response to processing the given observation as input. In some implementations, the intermediate neural network of the action selection policy neural network 112 is a recurrent neural network and the intermediate output corresponding to a respective auxiliary control neural network is the intermediate representation generated by the recurrent neural network for the given observation. In some implementations, the intermediate output corresponding to the respective auxiliary control neural network is the encoded representation generated by the convolutional encoder neural network of the action selection policy neural network 112 for the given observation.

Each of the auxiliary control neural networks is associated with one or more respective auxiliary task rewards. The auxiliary task rewards of the pixel control neural network 118 are derived from changes in the pixels in one or more regions from a given observation image 104 to a next observation image received as a result of the agent 110 performing an action 110 in response to the given observation 104. The auxiliary task rewards of the feature control neural network 120 are derived from changes in the activations generated by one or more units in a particular hidden layer of the action selection policy neural network 112 between processing a given observation 104 and processing of a next observation received as a result of the agent 108 performing an action 110 in response to the given observation.

Each auxiliary control neural network generates an auxiliary control policy output for each associated auxiliary task reward. The system 100 trains each of the auxiliary control neural networks to generate auxiliary control policy outputs that maximize the expected long-term time-discounted values of the corresponding auxiliary task rewards that would be achieved by selecting the actions of the agent based on the auxiliary control policy outputs.

The system 100 trains each auxiliary control neural network 112 using a reinforcement learning technique. The system 100 may train the auxiliary control neural network 112 online, based on experience tuples as they are generated, or the system 100 may train the auxiliary control neural network 112 based on experience tuples that were generated at previous time steps that a sampling engine 116 samples from the replay memory 114. The reinforcement learning technique may be an off-policy reinforcement learning technique, such as one-step or n-step Q-learning, or the reinforcement learning technique may be an on-policy reinforcement learning technique, such as a reinforcement learning technique that estimates value functions for each auxiliary task reward.

To train an auxiliary control neural network using the reinforcement learning technique, the system 100 backpropagates gradients that the system 100 determines according to the reinforcement learning technique to adjust the values of the set of parameters of the auxiliary control neural network, and to adjust the values of some of the set of parameters of the action selection policy neural network 112. In particular, the system adjusts the parameters of the action selection policy neural network corresponding to (i) the one or more units of the one or more hidden layers of the intermediate output of the action selection policy neural network 112 that the system 100 provides as input to the auxiliary control neural network, and (ii) units that feedforward into the one or more units of the one or more hidden layers of the intermediate output of the action selection policy neural network 112 that the system 100 provides as input to the auxiliary control neural network. In this specification, a first unit is said to feed-forward into a second unit if the output of the first unit is either directly or indirectly provided as an input to the second unit.

In addition to training the action selection policy neural network 112 to maximize the expected long-term time-discounted reward, the system 100 may train the action selection policy neural network 112 by additionally training a reward prediction neural network 122. Training the reward prediction neural network 122 tunes the values of the set of parameters of the action selection policy neural network 112 to recognize observations 104 that lead to receiving a high reward 106 at a subsequent time step, and thereby allows the action selection policy neural network 112 to determine more effective policy outputs to maximize the expected long-term time-discounted reward, even when non-zero rewards 106 are only rarely observed.

The reward prediction neural network 122 has a set of parameters, referred to in this specification as reward prediction neural network parameters, and is configured to receive as input one or more intermediate outputs generated by the action selection policy neural network 112 that characterize a sequence of observations received as a result of the interactions of the agent 108 with the environment 102. Since the reward prediction neural network 122 receives as input one or more intermediate outputs generated by the action selection policy neural network 112, the reward prediction neural network 122 may be considered as sharing parameters with the action selection policy neural network 112.

In some implementations, the intermediate neural network of the action selection policy neural network 112 is a recurrent neural network and the one or more intermediate outputs generated by the action selection policy neural network 112 that characterize the sequence of observations are the intermediate representation generated by the recurrent neural network for the last observation in the sequence.

In some implementations, the one or more intermediate outputs generated by the action selection policy neural network 112 that characterize the sequence of observations are the encoded representations of the action selection policy neural network 112 for the observations in the sequence. For example where the action selection policy neural network 112 includes a convolutional encoder neural network this may encode each state of a sequence of states from the replay memory.

The reward prediction neural network 122 processes the one or more intermediate outputs in accordance with the set of reward prediction neural network parameters to generate a redicted reward that is an estimate of an actual reward that will be received with a next observation that follows the last observation in the sequence.

The system 100 trains the reward prediction neural network 122 to generate a predicted reward that minimizes a reward prediction loss. In some implementations, the reward prediction loss is a mean-squared error loss between the predicted reward that is received with a next observation that follows the last observation in a sequence and the actual reward that is received with the next observation that follows the last observation in the sequence. In some other implementations, the reward prediction loss is a multi-class cross-entropy classification loss, where the three classes are zero reward, positive reward, and negative reward. Specifically, the system 100 backpropagates gradients to adjust the values of the set of parameters of the reward prediction neural network 122, and to adjust the values of some of the set of parameters of the action selection policy neural network 112, to minimize the reward prediction loss.

In general, the system 100 trains the reward prediction neural network 122 based on sequences of experience tuples that were generated at previous time steps that the sampling engine 116 samples from the replay memory 114. In some implementations, the sampling engine 116 samples sequences of experience tuples from the replay memory 114 where sequences for which the actual reward received with the observation following the last observation in the sequence is non-zero are sampled with a higher probability than sequences for which the actual reward received with the observation following the last observation in the sequence is zero. Biased sampling of experience tuple sequences from the replay memory 114 improves the training of the reward prediction neural network 122, and by extension the action selection policy neural network 112, particularly when non-zero rewards 106 are rarely received.

In some implementations, the system 100 augments on-policy reinforcement learning to train the action selection policy neural network 112 by additional off-policy reinforcement learning, where the off-policy reinforcement learning exploits newly discovered features of the action selection policy neural network 112 shaped by the system 100 training the reward prediction neural network 122. For example, the reinforcement learning technique that the system 100 uses to train the action selection policy neural network 112 may be an actor-critic reinforcement learning technique, where the policy output includes value estimates and Q-values. In this example, the system 100 trains the action selection policy neural network 112 using on-policy training based on experience tuples as they are generated, and performs additional off-policy reinforcement learning by performing extra value function regression on the value estimates for observations in sequences sampled by the sampling engine 116 from the replay memory 114.

Figure 1B:
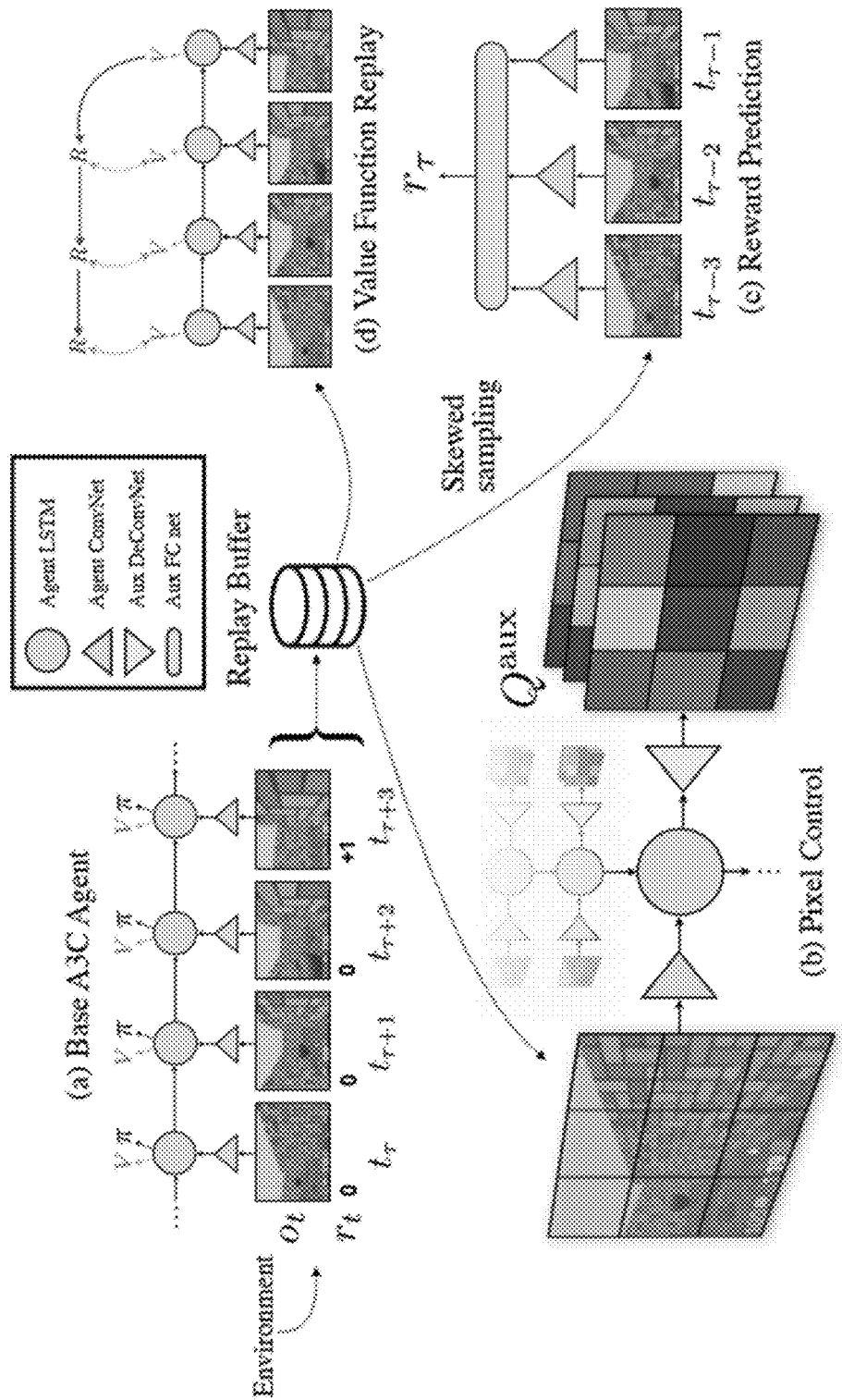
FIG. 1B shows an example implementation of a reinforcement learning system.

FIG. 1B shows an example implementation of the system 100. In this implementation, the action selection policy neural network (a) is a convolutional long short-term memory (LSTM) network trained on-policy with the A3C loss described in Volodymyr Mnih et. al., "Asynchronous methods for deep reinforcement learning," Proceedings of the 33$^{rd}$ International Conference on Machine Learning, 2016, where V represents value estimates and π represents policy output. The auxiliary control neural network (b) is a pixel control neural network generating Q-value policy outputs based on experiences sampled from a replay buffer. The reward prediction neural network (c) generates reward predictions based on experiences sampled from the replay buffer, where $r_\tau$ represents the predicted reward at time step τ, and skewed sampling refers to sampling sequences of experience tuples from the replay memory where sequences for which the actual reward received with the observation following the last observation in the sequence is non-zero are sampled with a higher probability than sequences for which the actual reward received with the observation following the last observation in the sequence is zero. The value function replay (d) indicates further reinforcement learning of the action selection policy neural network based on experiences sampled from the replay buffer.

Figure 2:
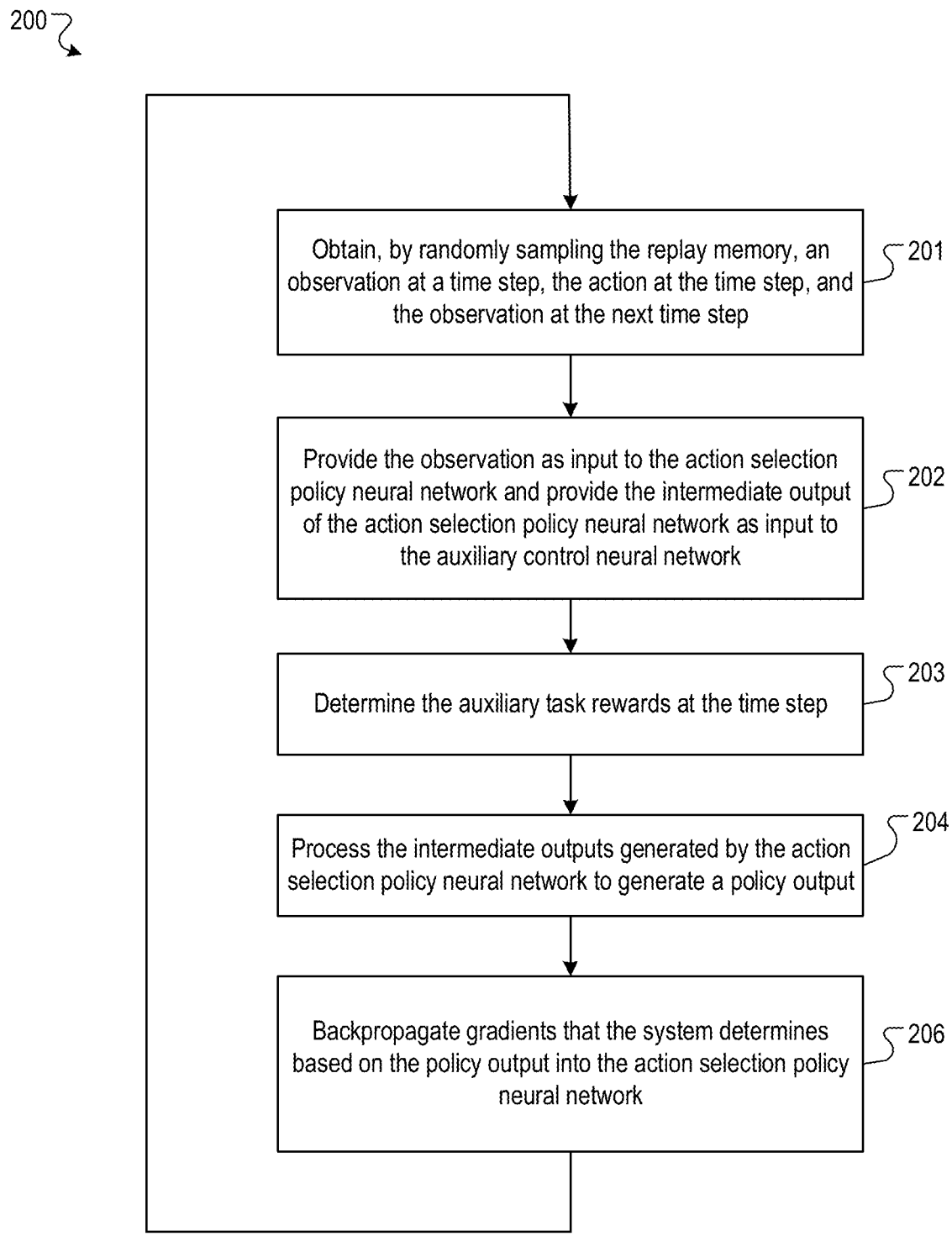
FIG. 2 is a flow diagram of an example process for training the action selection policy neural network by training an auxiliary control neural network.

FIG. 2 is a flow diagram of an example process 200 for training the action selection policy neural network by training an auxiliary control neural network. For convenience, the process 200 will be described as being performed by a system of one or more computers located in one or more locations. For example, a reinforcement learning system, e.g., the reinforcement learning system 100 of FIG. 1, appropriately programmed in accordance with this specification, can perform the process 200.

The system obtains an experience tuple for a time step, either as it is generated or from the replay memory, where the experience tuple includes the observation at the time step, the action of the agent at the time step, the reward received at the time step, and the observation of the next time step (step 201).

The system provides the observation at the time step as input to the action selection policy neural network, generates an intermediate output of the action selection policy neural network corresponding to the auxiliary control neural network, and provides the intermediate output as input to the auxiliary control neural network (step 202). In some implementations, the intermediate neural network of the action selection policy neural network is a recurrent neural network and the intermediate output corresponding to the auxiliary control neural network is the intermediate representation generated by the recurrent neural network for the observation at the time step. In some implementations, the intermediate output corresponding to the auxiliary control neural network is the encoded representation generated by the convolutional encoder neural network of the action selection policy neural network for the observation at the time step.

The system determines the auxiliary task rewards at the time step (step 203).

If the auxiliary control neural network is a pixel control neural network, then the observations are images, and the pixel control neural network is associated with an auxiliary task reward for each of one or more regions of the observation. The system derives the respective auxiliary task reward for each of the one or more regions from a change in the intensities of the pixels in the region from the observation image at the time step to the observation image at the next time step. For example, the system may determine the change in the intensities of the pixels in a region from the observation image at the time step to the observation image at the next time step by computing the change of the average intensity of the pixels in the region. As another example, the system may determine the change in the intensities of the pixels in a region from the observation image at the time step to the observation image at the next time step as a sum of the squared differences in the intensities of the individual pixels in the region. The system may determine the one or more regions of the observation image by dividing the observation image into regions delineated by an n×n non-overlapping grid placed over the observation image. In some implementations, the pixel control neural network is a deconvolutional neural network.

If the auxiliary control neural network is a feature control neural network, then the feature control neural network is associated with an auxiliary task reward for each of one or more sets of units of one or more hidden layers of the action selection policy neural network. For example, the feature control neural network may be associated with an auxiliary task reward for each unit of a particular hidden layer of the action selection policy neural network, and the system may determine the auxiliary task reward associated with a specific unit of the particular hidden layer as the difference between the activation of the unit generated during processing the observation at the time step and the activation of the unit generated during processing the observation at the next time step.

The auxiliary control neural network processes the intermediate output of the action selection policy neural network to generate policy outputs (step 204).

The auxiliary control neural network generates a policy output corresponding to each auxiliary task reward. The particular form of the policy outputs generated by the auxiliary control neural networks depends on the reinforcement learning technique used to train the auxiliary control neural network.

If the reinforcement learning technique is Q-learning, then the policy outputs generated by the auxiliary control neural network are, for each auxiliary task reward and for each possible action to be performed by the agent, an estimate of the long-term time-discounted auxiliary task reward if the agent performs the possible action in response to receiving the observation.

For example, if the reinforcement learning technique is Q-learning and the auxiliary control neural network is a pixel control neural network, then the policy outputs may be an $N_{act} \times n \times n$ tensor Q, where $N_{act}$ is the number of possible actions that can be performed by the agent and Q(a,i,j) is an estimate of the long-term time-discounted change in the pixels in the $(i,j)^{th}$ region of the n×n non-overlapping grid placed over the observation image if the agent performs the action a in response to the input received by the pixel control neural network.

As another example, if the auxiliary control neural network is a feature control neural network, then the policy outputs may be an $N_{act} \times m$ tensor Q, where m is the number of hidden units in a particular hidden layer of the action selection neural network, and Q(a,k) is an estimate of the long-term time-discounted change in the activations generated by the unit k if the agent performs the possible action a in response to the input received by the feature control neural network.

For each auxiliary task reward, the system backpropagates gradients that the system determines based on the auxiliary task reward and the policy output generated by the auxiliary control neural network for the auxiliary task reward, into the auxiliary control neural network and the action selection policy neural network (step 206). In general, for each auxiliary task reward, the system backpropagates gradients to maximize an expected long-term time-discounted auxiliary task reward that would be achieved by the system selecting actions in response to inputs in accordance with the policy output generated by the auxiliary control neural network corresponding to the auxiliary task reward. The gradients backpropagated by the system depend on the particular choice of reinforcement learning technique used to train the auxiliary control neural network. In some implementations, the system uses an off-policy reinforcement learning technique to train the auxiliary control neural network, such as one-step or n-step Q-learning. In some other implementations, the system uses an on-policy reinforcement learning technique to train the auxiliary control neural network, such as a reinforcement learning technique that learns value functions for each auxiliary task reward.

The system may associate a weight factor to each auxiliary task reward, and the gradients that the system backpropagates based on the auxiliary task reward and the policy output for the auxiliary task reward may be scaled by the associated weight factor.

By backpropagating gradients that the system determines based on the auxiliary task rewards and the policy outputs generated by the auxiliary control neural network into the action selection policy neural network, the system adjusts the parameters of the action selection policy neural network corresponding to (i) the one or more units of the one or more hidden layers of the intermediate output of the action selection policy neural network that the system provides as input to the auxiliary control neural network, and (ii) units that feed-forward into the one or more units of the one or more hidden layers of the intermediate output of the action selection policy neural network that the system provides as input to the auxiliary control neural network.

In general, the process 200 for training the action selection neural network by training the auxiliary control neural network repeats at each of multiple time steps. Moreover, for a given time step, the process 200 may be repeated one or more times, for example by repeatedly sampling the replay memory.

Figure 3:
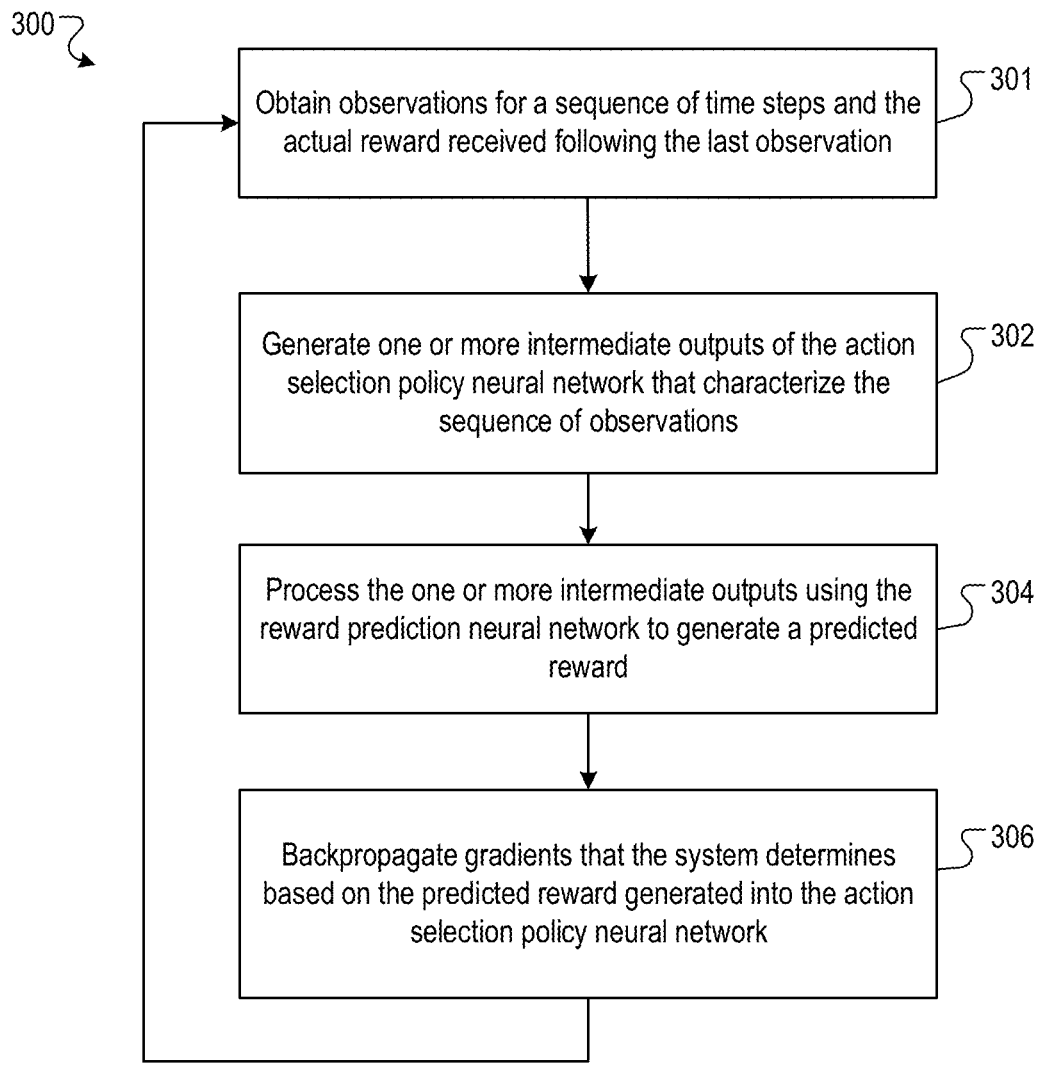
FIG. 3 is a flow diagram of an example process for training the action selection policy neural network by training a reward prediction neural network.

FIG. 3 is a flow diagram of an example process 300 for training the action selection policy neural network by training a reward prediction neural network. For convenience, the process 300 will be described as being performed by a system of one or more computers located in one or more locations. For example, a reinforcement learning system, e.g., the reinforcement learning system 100 of FIG. 1, appropriately programmed in accordance with this specification, can perform the process 300.

The system obtains experience tuple data from previous time steps in the replay memory, including observations for a sequence of previous time and the actual reward received with the observation following the last observation (step 301).

In some implementations, the system samples sequences from the replay memory for which the actual reward received with the observation following the last observation in the sequence is non-zero with a higher probability than sequences for which the actual reward received with the observation following the last observation in the sequence is zero. For example, the system may sample sequences so that the probability of sampling a sequence for which the actual reward received with the observation following the last observation in the sequence is non-zero with probability 0.5.

The system processes the sequence of observations using the action selection policy neural network to generate one or more intermediate outputs that characterize the sequence of observations (step 302).

In some implementations, the intermediate neural network of the action selection policy neural network is a recurrent neural network and the one or more intermediate outputs generated by the action selection policy neural network that characterize the sequence of observations are the intermediate representation generated by the recurrent neural network for the last observation in the sequence.

In some other implementations, the one or more intermediate outputs generated by the action selection policy neural network that characterize the sequence of observations are the encoded representations of the action selection policy neural network for the observations in the sequence.

The system provides the one or more intermediate outputs generated by the action selection policy neural network that characterize the sequence of observations as input to the reward prediction neural network, and the reward prediction neural network processes the sequence of one or more intermediate outputs according to a set of reward prediction neural network parameters to generate as output a prediction for the reward received with the observation following the last observation (step 304).

The system backpropagates gradients that the system determines based on the predicted reward generated by the reward prediction neural network into the reward prediction neural network and the action selection policy neural network (step 306). In general, the system backpropagates gradients to minimize a loss function. In some implementations, the loss function is given by the mean-squared error between the actual reward received with the observation following the last observation in the sequence and the prediction for the reward received with the observation following the last observation in the sequence. In some other implementations, the loss function is a multi-class cross-entropy classification loss, where the three classes are positive reward, negative reward, and zero reward.

The system may scale the gradients that the system backpropagates based on the predicted reward generated by the reward prediction neural network by a weight factor.

By backpropagating gradients that the system determines based on the predicted reward generated by the reward prediction neural network into the action selection policy neural network, the system adjusts the parameters of the action selection policy neural network corresponding to (i) the one or more units of the one or more hidden layers of the intermediate output of the action selection policy neural network that the system provides as input to the auxiliary control neural network, and (ii) units that feed-forward into the one or more units of the one or more hidden layers of the intermediate output of the action selection policy neural network that the system provides as input to the auxiliary control neural network.

For example, if the one or more intermediate outputs generated by the action selection policy neural network that characterize the sequence of observations for the one or more consecutive time steps that are provided as input to the reward prediction neural network are the encoded representations for the observations in the sequence, then backpropagating the gradients into the action selection policy neural network involves adjusting the parameters of the convolutional encoder neural network.

In general, the process 300 for training the action selection neural network by training the reward prediction neural network repeats at each of multiple time steps. Moreover, for a given time step, the process 300 is repeated one or more times, by repeatedly sampling the replay memory.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method comprising:
   training an action selection policy neural network using a first reinforcement learning technique,
      wherein the action selection policy neural network has a plurality of action selection policy network parameters and is used in selecting actions to be performed by an agent interacting with an environment,
      wherein the action selection policy neural network is configured to receive an input comprising an observation input and to process the input in accordance with the network parameters to generate an action selection policy output, and
      wherein training the action selection policy neural network comprises:
         receiving main task rewards; and
         training the action selection policy neural network to maximize an expected long-term time-discounted main task reward using the first reinforcement learning technique;
   during the training of the action selection policy neural network using the first reinforcement learning technique:
   training each of one or more auxiliary control neural networks on interactions of the agent with the environment during the training of the action selection policy neural network,
      wherein each of the auxiliary control neural networks has respective auxiliary control parameters and corresponds to a respective auxiliary control task and is configured to:
         receive a respective intermediate output generated by the action selection policy neural network, and
         generate a policy output for the corresponding auxiliary control task in accordance with the respective auxiliary control parameters of the auxiliary control neural network; and wherein training each auxiliary control neural network comprises:
receiving auxiliary task rewards that are specific to the corresponding auxiliary control task in response to the interactions of the agent with the environment; and
training the auxiliary control neural network to maximize an expected long-term time-discounted auxiliary task reward for the corresponding auxiliary control task using a respective second reinforcement learning technique, comprising:
determining gradients based on policy outputs generated by the auxiliary control neural network, comprising backpropagating gradients computed using the respective second reinforcement learning technique from the auxiliary control neural network into the action selection policy neural network; and
adjusting values of the respective auxiliary control parameters and the action selection policy network parameters using the gradients.

2. The method of claim 1, wherein the observation input includes an image,
wherein the auxiliary control neural networks comprise a pixel control neural network that corresponds to a pixel control task that attempts to maximize, for each of one or more regions of each observation image, a change in the pixels in the region, and
wherein, for each observation image, the respective reward for each of the one or more regions is derived from a change in the pixels in the region from the observation image to a next observation image received as a result of the agent performing an action in response to the observation image.

3. The method of claim 2, wherein the pixel control neural network is configured to, for a received observation image:
receive the respective intermediate output for the pixel control neural network; and
process the respective intermediate output to generate, for each of the one or more regions and for each of a plurality of possible actions to be performed by the agent, an estimate of the long-term time-discounted change in the pixels in the region if the agent performs the possible action in response to the received observation image.

4. The method of claim 2, wherein the pixel control neural network is a deconvolutional neural network.

5. The method of claim 1, wherein the observation input includes an image,
wherein the auxiliary control neural networks comprise a feature control neural network that corresponds to a feature control task that attempts to maximize activations generated by one or more units in a particular hidden layer of the action selection policy neural network, and
wherein, for each observation image, the respective reward for each of the one or more units is derived from a change in the activations of the unit from activations generated during processing the observation image to activations generated during processing of a next observation image received as a result of the agent performing an action in response to the observation image.

6. The method of claim 5, wherein the feature control neural network is configured to, for a received observation image:
receive the respective intermediate output for the feature control neural network; and
process the respective intermediate output to generate, for each of the one or more units and for each of a plurality of possible actions to be performed by the agent, an estimate of the long-term time-discounted change in the activations generated by the unit if the agent performs the possible action in response to the received observation image.

7. The method of claim 1, further comprising, during the training of the action selection policy neural network using the first reinforcement learning technique:
training a reward prediction neural network on interactions of the agent with the environment during the training of the action selection policy neural network,
wherein the reward prediction neural network has reward prediction parameters and is configured to:
receive one or more intermediate outputs generated by the action selection policy neural network that characterize a sequence of observation images received as a result of the interactions of the agent with the environment, and
process the one or more intermediate outputs in accordance with the reward prediction parameters to generate a predicted reward that is an estimate of a reward that will be received with a next observation image that follows a last observation image in the sequence; and
wherein training the reward prediction neural network comprises:
determining gradients based on predicted rewards generated by the reward prediction neural network; and
adjusting values of the reward prediction parameters and the action selection policy network parameters using the gradients.

8. A system comprising:
one or more computers; and
one or more storage devices communicatively coupled to the one or more computers, wherein the one or more storage devices store instructions that, when executed by the one or more computers, cause the one or more computers to perform operations comprising:
training an action selection policy neural network using a first reinforcement learning technique,
wherein the action selection policy neural network has a plurality of action selection policy network parameters and is used in selecting actions to be performed by an agent interacting with an environment,
wherein the action selection policy neural network is configured to receive an input comprising an observation input and to process the input in accordance with the network parameters to generate an action selection policy output, and
wherein training the action selection policy neural network comprises:
receiving main task rewards; and
training the action selection policy neural network to maximize an expected long-term time-discounted main task reward using the first reinforcement learning technique;
during the training of the action selection policy neural network using the first reinforcement learning technique:

training each of one or more auxiliary control neural networks on interactions of the agent with the environment during the training of the action selection policy neural network,
  wherein each of the auxiliary control neural networks has respective auxiliary control parameters and corresponds to a respective auxiliary control task and is configured to:
    receive a respective intermediate output generated by the action selection policy neural network, and
    generate a policy output for the corresponding auxiliary control task in accordance with the respective auxiliary control parameters of the auxiliary control neural network; and
  wherein training each auxiliary control neural network comprises:
    receiving auxiliary task rewards that are specific to the corresponding auxiliary control task in response to the interactions of the agent with the environment; and
    training the auxiliary control neural network to maximize an expected long-term time-discounted auxiliary task reward for the corresponding auxiliary control task using a respective second reinforcement learning technique, comprising:
      determining gradients based on policy outputs generated by the auxiliary control neural network, comprising backpropagating gradients computed using the respective second reinforcement learning technique from the auxiliary control neural network into the action selection policy neural network; and
      adjusting values of the respective auxiliary control parameters and the action selection policy network parameters using the gradients.

9. The system of claim 8, wherein the observation input includes an image,
  wherein the auxiliary control neural networks comprise a pixel control neural network that corresponds to a pixel control task that attempts to maximize, for each of one or more regions of each observation image, a change in the pixels in the region, and
  wherein, for each observation image, the respective reward for each of the one or more regions is derived from a change in the pixels in the region from the observation image to a next observation image received as a result of the agent performing an action in response to the observation image.

10. The system of claim 9, wherein the pixel control neural network is configured to, for a received observation image:
  receive the respective intermediate output for the pixel control neural network; and
  process the respective intermediate output to generate, for each of the one or more regions and for each of a plurality of possible actions to be performed by the agent, an estimate of the long-term time-discounted change in the pixels in the region if the agent performs the possible action in response to the received observation image.

11. The system of claim 9, wherein the pixel control neural network is a deconvolutional neural network.

12. The system of claim 8, wherein the observation input includes an image,
  wherein the auxiliary control neural networks comprise a feature control neural network that corresponds to a feature control task that attempts to maximize activations generated by one or more units in a particular hidden layer of the action selection policy neural network, and
  wherein, for each observation image, the respective reward for each of the one or more units is derived from a change in the activations of the unit from activations generated during processing the observation image to activations generated during processing of a next observation image received as a result of the agent performing an action in response to the observation image.

13. The system of claim 12, wherein the feature control neural network is configured to, for a received observation image:
  receive the respective intermediate output for the feature control neural network; and
  process the respective intermediate output to generate, for each of the one or more units and for each of a plurality of possible actions to be performed by the agent, an estimate of the long-term time-discounted change in the activations generated by the unit if the agent performs the possible action in response to the received observation image.

14. The system of claim 8, wherein the operations further comprise, during the training of the action selection policy neural network using the first reinforcement learning technique:
  training a reward prediction neural network on interactions of the agent with the environment during the training of the action selection policy neural network,
    wherein the reward prediction neural network has reward prediction parameters and is configured to:
      receive one or more intermediate outputs generated by the action selection policy neural network that characterize a sequence of observation images received as a result of the interactions of the agent with the environment, and
      process the one or more intermediate outputs in accordance with the reward prediction parameters to generate a predicted reward that is an estimate of a reward that will be received with a next observation image that follows a last observation image in the sequence; and
    wherein training the reward prediction neural network comprises:
      determining gradients based on predicted rewards generated by the reward prediction neural network; and
      adjusting values of the reward prediction parameters and the action selection policy network parameters using the gradients.

15. One or more non-transitory computer storage media storing instructions that when executed by one or more computers cause the one or more computers to perform operations comprising:
  training an action selection policy neural network using a first reinforcement learning technique,
    wherein the action selection policy neural network has a plurality of action selection policy network parameters and is used in selecting actions to be performed by an agent interacting with an environment,
    wherein the action selection policy neural network is configured to receive an input comprising an observation input and to process the input in accordance with the network parameters to generate an action selection policy output, and
    wherein training the action selection policy neural network comprises:

receiving main task rewards; and training the action selection policy neural network to maximize an expected long-term time-discounted main task reward using the first reinforcement learning technique;

during the training of the action selection policy neural network using the first reinforcement learning technique:

training each of one or more auxiliary control neural networks on interactions of the agent with the environment during the training of the action selection policy neural network, wherein each of the auxiliary control neural networks has respective auxiliary control parameters and corresponds to a respective auxiliary control task and is configured to:

receive a respective intermediate output generated by the action selection policy neural network, and generate a policy output for the corresponding auxiliary control task in accordance with the respective auxiliary control parameters of the auxiliary control neural network; and wherein training each auxiliary control neural network comprises:

receiving auxiliary task rewards that are specific to the corresponding auxiliary control task in response to the interactions of the agent with the environment; and training the auxiliary control neural network to maximize an expected long-term time-discounted auxiliary task reward for the corresponding auxiliary control task using a respective second reinforcement learning technique, comprising:

determining gradients based on policy outputs generated by the auxiliary control neural network, comprising backpropagating gradients computed using the respective second reinforcement learning technique from the auxiliary control neural network into the action selection policy neural network; and adjusting values of the respective auxiliary control parameters and the action selection policy network parameters using the gradients.

16. The one or more non-transitory computer storage media of claim 15, wherein the observation input includes an image, wherein the auxiliary control neural networks comprise a pixel control neural network that corresponds to a pixel control task that attempts to maximize, for each of one or more regions of each observation image, a change in the pixels in the region, and wherein, for each observation image, the respective reward for each of the one or more regions is derived from a change in the pixels in the region from the observation image to a next observation image received as a result of the agent performing an action in response to the observation image.

17. The one or more non-transitory computer storage media of claim 16, wherein the pixel control neural network is configured to, for a received observation image:

receive the respective intermediate output for the pixel control neural network; and process the respective intermediate output to generate, for each of the one or more regions and for each of a plurality of possible actions to be performed by the agent, an estimate of the long-term time-discounted change in the pixels in the region if the agent performs the possible action in response to the received observation image.

18. The one or more non-transitory computer storage media of claim 16, wherein the pixel control neural network is a deconvolutional neural network.

19. The one or more non-transitory computer storage media of claim 15, wherein the observation input includes an image, wherein the auxiliary control neural networks comprise a feature control neural network that corresponds to a feature control task that attempts to maximize activations generated by one or more units in a particular hidden layer of the action selection policy neural network, and wherein, for each observation image, the respective reward for each of the one or more units is derived from a change in the activations of the unit from activations generated during processing the observation image to activations generated during processing of a next observation image received as a result of the agent performing an action in response to the observation image.

20. The one or more non-transitory computer storage media of claim 19, wherein the feature control neural network is configured to, for a received observation image:

receive the respective intermediate output for the feature control neural network; and process the respective intermediate output to generate, for each of the one or more units and for each of a plurality of possible actions to be performed by the agent, an estimate of the long-term time-discounted change in the activations generated by the unit if the agent performs the possible action in response to the received observation image.

* * * * *